Feb. 13, 1951     R. M. HEALEY     2,541,962
NOSEPIECE SPACER
Filed Sept. 30, 1948
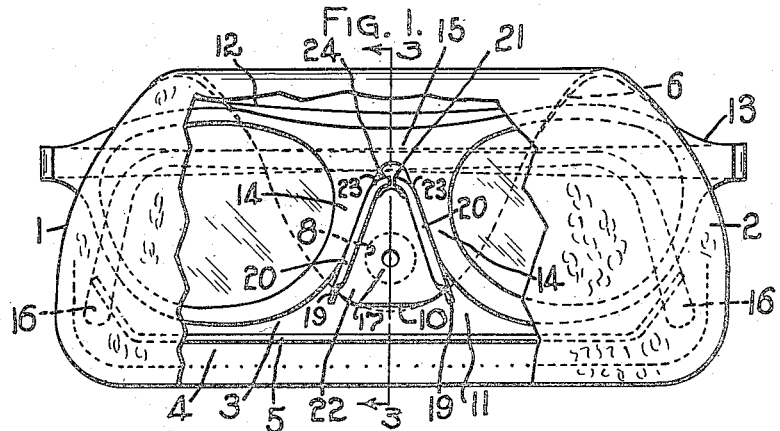
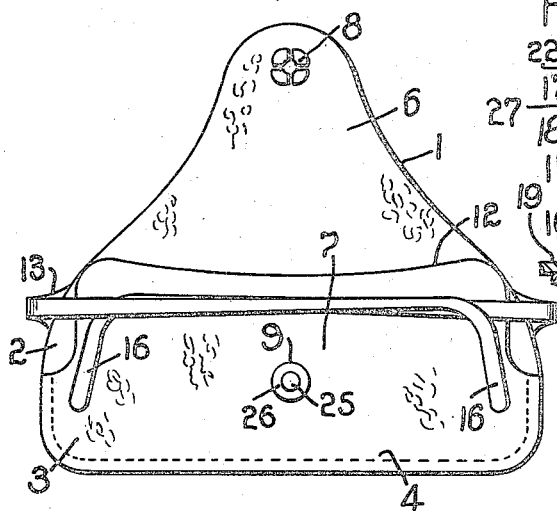
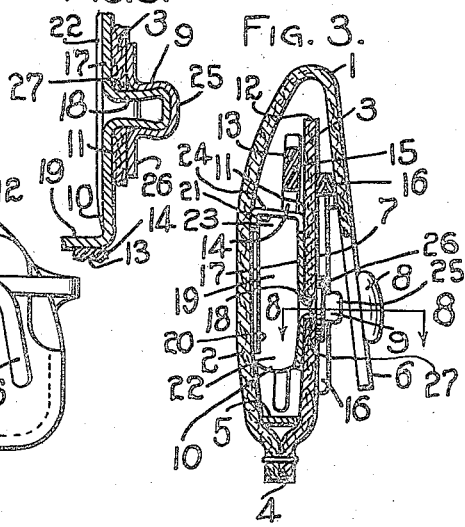
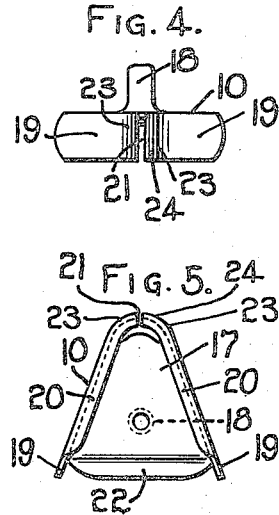
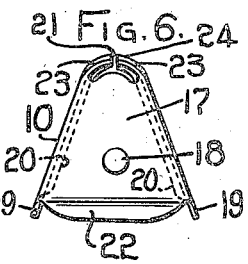
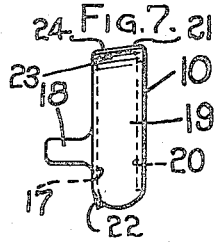
Inventor
ROBERT M. HEALEY:
By Walter S. Jones
Attorney Patented Feb. 13, 1951

2,541,962

UNITED STATES PATENT OFFICE 2,541,962

NOSEPIECE SPACER

Robert M. Healey, Hamilton, Ontario, Canada, assignor to United-Carr Fastener Company of Canada Limited, Hamilton, Ontario, Canada, a corporation of the Dominion of Canada Application September 30, 1948, Serial No. 52,073
In Canada November 21, 1947

2 Claims. (Cl. 206—5)

This invention relates to a nosepiece spacer commonly used in eyeglass cases to support a pair of glasses and maintain the same in spaced relation to the bottom of the eyeglass case.

One object of my invention is the provision of a novel nosepiece spacer of simple construction which is capable of easy attachment to a wall of the glasses case.

Another object of my invention is the provision of a nosepiece spacer having an attaching element cooperating with a snap fastener element in a way to secure the parts on opposed sides of a glasses case wall.

Other objects of my invention will be understood from inspection of the drawings and specification hereinbelow set forth.

Referring to the drawing:

Fig. 1 is a plan view of the rear wall of an eyeglass case partly broken away to illustrate the construction and purpose of the invention;

Fig. 2 is a front plan view of an eyeglass case with glasses assembled therewith, the flap of the case being in opened position;

Fig. 3 is a section taken along the line 3—3 of Fig. 1;

Fig. 4 is a top view of my improved nosepiece spacer per se;

Fig. 5 is a front view of the nosepiece spacer;

Fig. 6 is a rear view of the nosepiece spacer;

Fig. 7 is a side view of the spacer; and

Fig. 8 is a section taken along the line 8—8 of Fig. 3.

Referring to Figs. 1, 2 and 3 of the drawing, I have illustrated a preferred assembly embodying my improved nosepiece spacer which includes an eyeglass case 1 having a rear wall 2 and a front wall 3. The walls 2 and 3 may be stitched together at the lower side of the case to form a bottom wall 4. A metal stiffening member 5 may be positioned adjacent the bottom wall 4 to give rigidity and shape to the glasses case. A flap 6 extends from the upper edge of the rear wall 2 which overlaps the outer surface 7 of the front wall 3 and is secured to the same by means of a socket snap fastener element 8 which is engaged with a stud snap fastener member 9 projecting from the front wall 3. My improved nosepiece spacer 10 is secured to the inner surface 11 of the front wall 3 preferably in position between the top edge 12 of the front wall and the bottom 4 of the case. A pair of eyeglasses 13 is preferably positioned within the case in such a way that the side elements 14 of its bridge portion 15 are supported by the nosepiece spacer 10 so as to maintain the eyeglasses in fixed spaced position relative to the bottom 4 of the case. When the eyeglasses are arranged in this position, the bows 16 of the glasses may extend outside the outer surface 7 of the wall 3 of the case as most clearly shown in Fig. 2.

Referring specifically to the construction of my nosepiece spacer 10, I have illustrated in Figs. 4 to 7 a preferred device. Thus the spacer, which is preferably made from one piece of sheet metal, is of generally triangular form and provides a back portion 17. A tubular attaching element 18 preferably drawn from the material of the backing portion extends outwardly from one side thereof as most clearly shown in Figs. 6 and 7. Wing-shaped supporting elements 19 extend from opposed side edges of the back portion 17 in substantially normal relation to the plane of the back portion in a direction opposite to that taken by the attaching element 18. The outer edges of the wing elements 19 have inwardly turned portions 20 at substantially their entire lengths to effect a broad surface at the extremities of the wings 19. In view of the fact that the back portion 17 is formed to have a substantially triangular shape, the wing elements 19 integrally joined to the marginal edges thereof diverge from points adjacent the top or vertex 21 of the back portion 17 toward the bottom or base 22 of the back portion. As a result of this construction the wing portions 19 will conveniently engage and support the side elements 14 of the bridge 15 of the eyeglasses as illustrated in Fig. 1. In order that the wing elements 19 may provide a smooth broad surface at the top of the spacer, the outer ends 23 of the wing elements adjacent the top of the spacer are turned inwardly as shown in Figs. 5 and 6 to form a generally rounded or arcuate top supporting element 24.

Attachment of the spacer 10 to the inner surface 11 of the front wall 3 is effected through engagement of the tubular attaching element 18 and the stud snap fastener element 9. The element 9 which is of well-known construction provides a headed hollow portion 25 and a flange or base element 26 at one end of the element 25 adapted to lie adjacent the outer surface 7 of the wall 3 in secured position. In attachment of the parts, the back portion 17 of the spacer 10, is disposed adjacent the inner surface 11 of the wall 3 with the attaching element 18 extending through an opening 27 of the wall 3 into the hollow headed portion 25 of the stud member. Thereafter, by a suitable tool the attaching element 18 is collapsed within the headed element 25, as most clearly shown in Fig. 8, to secure the spacer to the wall 3 on the inner side thereof, at the same time securing the stud member to the outer surface 7 of the wall 3. It will be understood that the opening 27 of the front cover 3 through which the attaching element extends is located in predetermined position to position correctly not only the spacer 10 on the inside of the wall 3 but also the stud element 9 on the outer side of the wall 3 for cooperating snap fastener engagement with the socket member 8.

Thus, by my invention I have provided an efficient nosepiece spacer of simple construction which operates efficiently to carry out the objects hereinabove described.

Although I have illustrated and described a preferred embodiment of my invention, I do not wish to be limited thereby because the scope of my invention thereof is best defined by the following claims.

I claim:

1. A spectacle case nose block comprising a one-piece sheet material polygonal body having a flat mounting plate portion with opposing sides tapering toward a rounded end opposite a substantially straight third side, an integral drawn stud extending substantially normal one face of the plate portion adapted for insertion through an aperture of a wall of a spectacle case and for being secured within a hollow stud member on a face of such wall opposite that engaged by said plate portion, integral side flanges extending from said opposing sides of said plate portion substantially normal thereto in a direction opposite to said stud, said side flanges having arcuate side extensions projecting beyond the ends of said plate portion sides at the rounded end of said plate portion into spaced abutting relationship and having straight side extensions projecting beyond the opposite ends of said plate portion sides, said side flanges having inwardly extending opposing end flanges opposite said plate portion, and an integral side flange extending angularly from the side of said plate portion opposite said rounded end away from said stud, the outer edges of said plate portion at the junctions with said side flanges and the outer edges of the opposing side flanges at the junction with said inturned flanges being rounded and smooth, said plate portion and said inturned end flanges providing opposed surfaces for engaging and spacing opposed walls of a spectacle case, and said opposed side flanges providing sloping surfaces for receiving the nosepiece of a pair of spectacles when the nose block is mounted in a spectacle case.

2. A spectacle case nose block comprising a one-piece sheet material body of substantially triangular shape having a flat mounting plate portion, an integral drawn hollow stud portion extending substantially normal one face of said plate portion adapted for insertion through an aperture of a wall of a spectacle case and for secured engagement within a hollow stud member on a face of such wall opposite said plate portion, separate flanges extending integrally from two sides of said mounting portion substantially normal thereto opposite said stud and having their ends opposite said plate portion turned inwardly toward each other substantially normal said flanges, said inturned ends and said plate portions providing surfaces for engaging the opposed faces of opposite walls of a spectacle case, and said flanges providing sloping surfaces for receiving the nosepiece of a pair of spectacles when the nose block is mounted in a spectacle case.

ROBERT M. HEALEY.

REFERENCES CITED

The following references are of record in the file of this patent:

UNITED STATES PATENTS

| Number | Name | Date |
| --- | --- | --- |
| 2,464,149 | Pearlstein | Mar. 8, 1949 |